Jan. 25, 1927.
H. C. MALLORY
1,615,591
PROCESS OF MAKING EXPANSIBLE COLLAPSIBLE ELEMENTS
Original Filed Sept. 3, 1920
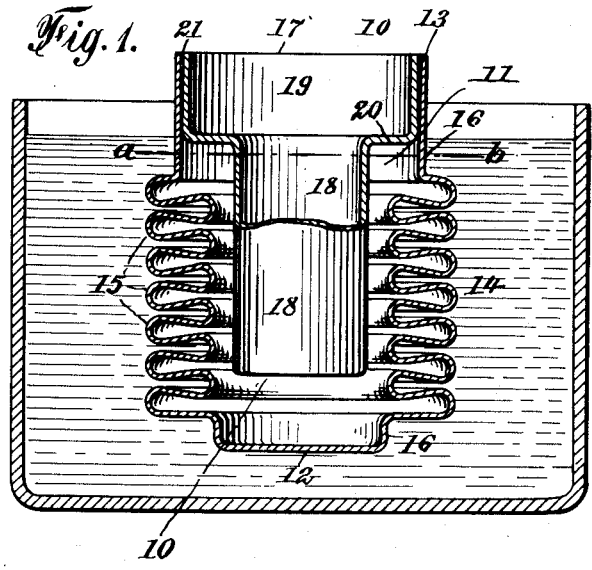
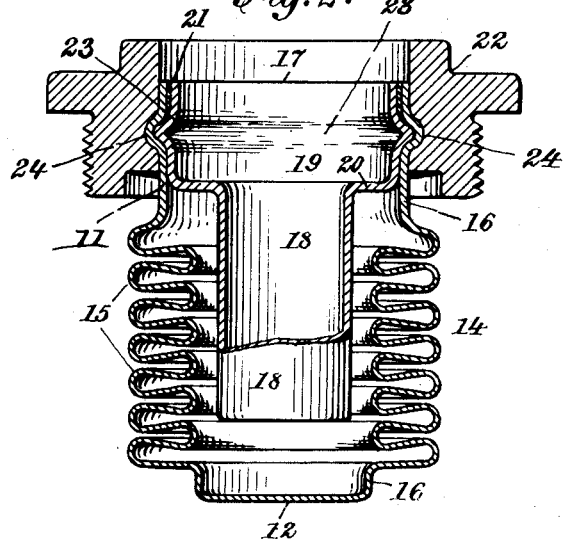
Inventor
Harry C. Mallory
By Conrad A. Dieterich
his Attorney Patented Jan. 25, 1927.

1,615,591

UNITED STATES PATENT OFFICE.

HARRY C. MALLORY, OF BELLPORT, NEW YORK, ASSIGNOR, BY MESNE ASSIGNMENTS, TO AMERICAN RADIATOR COMPANY, OF CHICAGO, ILLINOIS, A CORPORATION OF NEW JERSEY.

PROCESS OF MAKING EXPANSIBLE COLLAPSIBLE ELEMENTS.

Application filed September 3, 1920, Serial No. 408,109. Renewed June 20, 1925.

My invention relates to improvements in expansible-collapsible elements, and the same has for its object, more particularly, to provide a simple, efficient and practical process of sealing such elements in order to render the same suitable for use in connection with apparatus, devices or parts requiring a fluid-tight joint between the open end of said element and the closure therefor.

Further, said invention has for its object to provide a process of sealing an element of the character specified in such manner that its elastic or flexible qualities will not be injured or impaired by the operation of sealing a closure to the open end of the expansible-collapsible element.

Further, said invention has for its object to provide a process of sealing an element of the character specified by means of which a closure may be soldered to the open end portion thereof without injuring, impairing or otherwise unduly affecting the temper or character of the metal of the flexible or elastic portion of the element.

Further, said invention has for its object to provide a process of producing a closed expansible-collapsible element, by means of which a suitable closure may be secured thereto by hard solder without in any way injuriously affecting the metal of the flexible or elastic portion of the element.

Further, said invention has for its object to provide a process whereby the several parts of an expansible-collapsible element may be hermetically secured together, and to a suitable support without danger of injuring or affecting the temper or character of the metal of which the element is formed.

Other objects will in part be obvious, and in part be pointed out hereinafter.

To the attainment of the aforesaid objects and ends my invention consists in the novel process embodying the successive steps hereinafter more fully described and then pointed out in the claims.

In the accompanying drawings forming part of this specification wherein like numerals of reference indicate like parts—

Figure 1 is a central sectional view illustrating a closed expansible-collapsible element constructed according to, and embodying my said invention, the parts being exaggerated in order better to show the same, and Fig. 2 is a similar view showing a closed expansible-collapsible element mechanically secured to a support, and sealed thereto.

In said drawings 10 designates a closed expansible-collapsible element, which when sealed, is adapted to hold a volatile or expansible liquid. The said element 10 consists of a shell 11 of cylindrical form having a closed end 12, an open end 13, and an intermediate or body portion 14 provided with a series of parallel, circumferential corrugations 15. The shell 10 is further provided intermediate its ends 12, 13 and the corrugated intermediate or body portion 14 with flat, annular portions 16. The shell 10 is preferably formed with its ends 12, 13, of greater thickness than its intermediate or corrugated body portion 14, in order to simplify and facilitate the attaching of the same to its closure, as well as to its support, where one is employed. However, the entire wall and ends of the shell 10, may, if desired, be made of uniform thickness throughout.

17 denotes a closure for said shell 10 comprising a hollow, cylindrical member 18 of smaller diameter than the interior diameter of the corrugated body portion 15 of the shell within which the same extends, and a tubular portion 19 whose external diameter corresponds substantially with the internal diameter of the flat, annular end portion 16 of the shell 10. The tubular portion 19 is connected with the cylindrical member 18 by a horizontal portion 20.

In order to form an hermetical seal for the expansible-collapsible element the inner surface of the annular end portion 16, and the outer surface of the tubular portion 19 of the closure 17 are suitably prepared for soldering, and thereupon the desired solder 21 is applied to one or both of said surfaces adjacent to the outer edges or ends thereof. The closure 17 is then fitted into the shell 10 until the edge of the tubular portion 19 registers with the corresponding edge of the open end portion 13 of the shell 10.

Hereupon the shell 10 is inserted into a receptacle containing water, oil or other suitable liquid and immersed to the height indicated by the broken line a—b. It will be observed that when the shell 10 is immersed in liquid to the height indicated by the line a—b, the entire corrugated or flexible body portion 14, and the part immediately above the same will be entirely under liquid, and that only the narrow, annular band of the end portion 13, which is to be soldered, will be exposed.

Hereupon heat is applied to the exposed end portion of the expansible-collapsible element or shell 10 and closure 17 in order to fuse the solder 21 and thus form a fluid tight joint.

At Figure 2 the expansible-collapsible element 10 is shown mechanically secured within a support 22, and the closure 17 hermetically sealed thereto by solder 21. In said Fig. 2, the expansible-collapsible element 10 having its closure in place therein is first secured within said support by simultaneously pressing an annular bead or rim 23 in the registering ends of the shell 10 and the closure 18, and forcing or expanding the same into an annular groove 24 in the support 22 whereby said parts will be mechanically secured together.

The corresponding surfaces of the closure 17, the expansible-collapsible element 10 and of the support 22 should first be properly prepared and solder applied thereto whereupon the device is immersed in a receptacle containing liquid and heat applied to said end portions until the solder fuses and unites the parts thereby forming a fluid-tight joint.

It is to be noted that by immersing in a liquid the parts of the apparatus, which are not to be subjected to heat during the soldering operation it becomes possible to subject the exposed parts to a high temperature, and permit of the employment of hard solder, having a high fusing point, without the slightest danger of injuring the submerged parts or drawing the temper thereof.

Having thus described my said invention what I claim and desire to secure by Letters Patent is:—

1. The process of sealing an expansible-collapsible element which consists in immersing in a liquid the parts thereof which are subject to flexure, applying a sealing medium to the parts not immersed and subjecting said parts to heat to fuse said sealing medium, substantially as specified.

2. The process of sealing an expansible-collapsible element which consists in immersing in a liquid the parts thereof which are subject to flexure, applying a sealing medium to the parts to be united which are disposed without the liquid and then subjecting said last-named parts locally to the action of heat to fuse said sealing medium and unite said parts, substantially as specified.

3. The process of sealing an expansible-collapsible element and securing the same to a support which consists in associating said element with a support, immersing in a liquid the parts of said element which are subject to flexure, applying a sealing medium to the surfaces of the parts of said element and support which are to be joined and then subjecting said last-named parts to the action of heat to fuse said sealing medium, substantially as specified.

4. The process of sealing an expansible-collapsible element comprising a cylindrical shell having a circumferentially corrugated body portion which consists in immersing in liquid said corrugated body portion, applying solder to the portions to be joined, which are not submerged, and then locally subjecting said last-named parts to heat whereby to fuse said solder and unite said parts, substantially as specified.

5. The process of sealing an expansible-collapsible element comprising a cylindrical shell having an open end and a circumferentially corrugated body portion, which consists in inserting a closure within the open end of said shell, immersing in a liquid said corrugated body portion and leaving the parts to be sealed above the level of said liquid, applying solder to the exposed part of said shell, and then locally subjecting the exposed part of said shell and said closure to heat whereby to fuse said solder and unite said closure to the open end of said shell, substantially as specified.

6. The process of sealing an expansible-collapsible element and securing the same to a support which consists in disposing the end of said element within a support, inserting a closure into said open end, immersing in a liquid the portion of said element subject to flexure, applying solder to the open end of said element and to said closure and said support, and then subjecting said parts to heat whereby to fuse said solder and unite said parts, substantially as specified.

Signed at the city of New York, New York County, in the State of New York, this first day of June, one thousand nine hundred and twenty.

HARRY C. MALLORY.